Patented Feb. 26, 1952

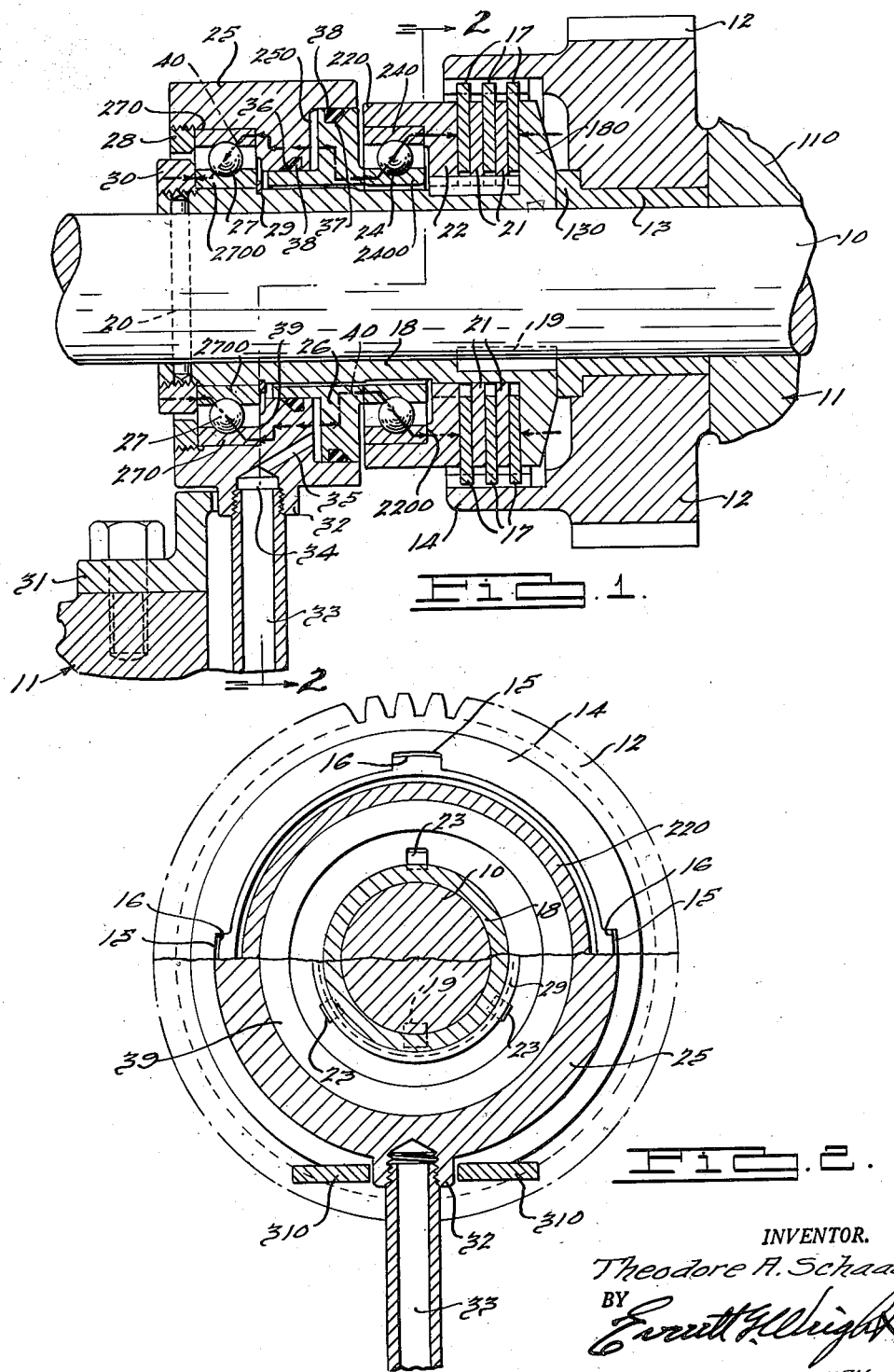

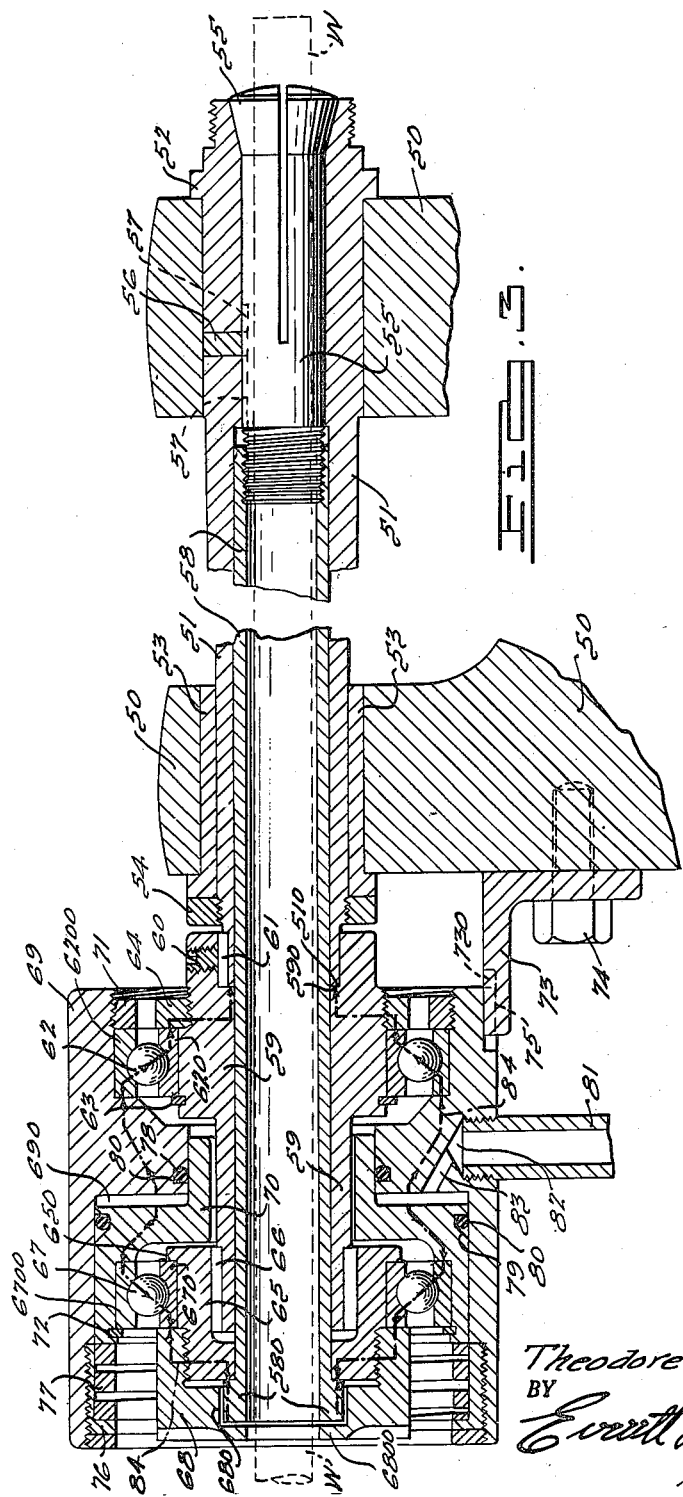

2,587,230

UNITED STATES PATENT OFFICE 2,587,230

HYDRAULIC MEANS FOR ACTUATING FRICTIONAL DISK CLUTCHES

Theodore A. Schaad, Detroit, Mich.

Application July 27, 1946, Serial No. 686,732

1 Claim. (Cl. 121—38)

This invention relates to clutch mechanism and in particular to improved fluid operated method and means for imparting axial pressure on and movement to rotating elements such as found in clutches, spindles and other machine elements mounted on rotating shafts.

Fluid operated means for applying axial pressure and motion to elements on rotating shafts and spindles are old in the art as illustrated by air and oil operated chucks and clutches. The prior art mechanisms generally require fluid passages or connections to and from rotating elements which involve the use of seals or packing glands which not only increase frictional losses between rotating and stationary elements but constantly wear and leak when operated at high speeds and under pressures.

The primary object of the present invention is to provide a method and means for applying axial pressure or movement to rotating elements which eliminate the use of seals and glands between the fixed and the rotating elements to which axial movement or pressure is applied.

A further object of the invention is to provide a fluid operated clutch or chuck wherein the required axial movement is provided by fluid means and is transmitted from the stationary element to the rotating element preferably through combined radial and thrust type ball bearings.

Other objects of the invention will become apparent by reference to the following detailed description taken in connection with the accompanying drawings, in which:

Fig. 1 is a longitudinal sectional view of a fluid operated clutch illustrating the invention.

Fig. 2 is a transverse sectional view taken on the line 2—2 of Fig. 1.

Fig. 3 is a longitudinal sectional view of a fluid operated chuck or spring collet illustrating another use of the invention.

Referring now to the drawings wherein like numerals refer to like and corresponding parts throughout the several views, the fluid operated clutch illustrating one application of the invention shown in Figs. 1 and 2 comprises a shaft 10 rotatably mounted in a bearing 110 of a machine 11 or other device, the said shaft 10 being either a drive shaft or a driven shaft. For convenience in describing the invention, the said shaft 10 will be considered to be a drive shaft. The gear or driven member 12 has a shouldered bushing 13 fixed therein and is mounted thereby freely rotatable on the drive shaft 10. The said driven member 12 is provided with an interiorly splined annular cup shaped hub 14 extending axially therefrom. The female splines 15 of the said cup shaped hub 14 receive the male splines 16 of the clutch discs 17 which are normally freely axially slidable with respect to and within the said cup shaped hub 14 of the driven member 12.

A flanged sleeve 18 having its flange 180 disposed adjacent to the shoulder 130 of the bushing 13 is keyed to the drive shaft 10 by means of keys 19 and is axially fixed on the said drive shaft 10 by a pin 20 with sufficient clearance allowed between the flange 180 thereof and the shoulder 130 of the bushing 13 of the driven member 12 to permit the driven member 12 to rotate freely on the drive shaft 10.

Clutch discs 21 are disposed between the clutch discs 17 and an annular clutch pressure plate 22 is positioned axially against the outermost clutch disc 17, the said clutch discs 21 and pressure plate 22 being axially slidable on the said flanged sleeve 18 and splined thereto for rotation therewith by means of the male splines 23 with which female splined clutch discs 21 and the pressure plate 22 cooperate.

A combined radial and thrust type ball bearing 24 are mounted in the axially cupped end 220 of the clutch pressure plate 22 with the outer race 240 thereof pressed therein in axial bearing against the axially disposed annular shoulder 2200 formed within the cupped end of the clutch pressure plate 22. The inner race 2400 of the said ball bearing 24 is thus spaced from the clutch pressure plate 22 and the flanged sleeve 18.

An annular cylinder 25 into which an annular piston 26 is reciprocatingly fit is supported in radial spaced relationship to the flanged sleeve 18 on the outer race 270 of a combined radial and thrust bearing 27 and is fixed to the said outer race 270 of the said ball bearing 27 by means of a spanner nut 28. The inner race 2700 of the said ball bearing 27 is pressed on the flanged sleeve 18 and fixed thereon against movement relative thereto between a retainer ring 29 disposed in a suitable groove formed in the flanged sleeve 18 and a spanner nut 30 threaded thereon. A bifurcated bracket 31 secured to the machine 11 having the forks 310 thereof disposed on each side of a female nipple 32 formed in the side of the annular cylinder 25 prevents the said annular cylinder 25 from rotating with the inner race 2700 of the ball bearing 27 which rotates with the flanged sleeve 18 and the drive shaft 10. A suitable fluid pressure supply line 33 is connected to the said nipple 32 and the annular cylinder 25 is provided with suitable bores 34 and 35 which communicate between the nipple 32 and the cylinder chamber 250, thus providing passage for fluid under pressure from the pressure supply line 33 to the cylinder chamber 250 for the purpose of actuating the annular piston 26. Suitable inner and outer circumferential grooves 36 and 37 are provided in the sliding surfaces of the annular cylinder 25 and piston 26 respectively which receive O-rings 38 or other suitable sealing means to prevent leakage of operating fluid from the cylinder chamber 250. It will be noted that the annular cylinder 25 is provided with a suitable annular shoulder 39 which bears against the outer race 270 of the bearing 27 and the annular piston 26 is provided with a suitable annular shoulder 40 which bears against the inner race 2400 of the bearing 24.

When no fluid pressure is applied to the annular piston 26 the clutch mechanism herein described is disengaged, and the drive shaft 10 is under rotation and rotates with it the flanged sleeve 18 keyed to the said drive shaft 10, the clutch discs 21 and the annular cupped clutch pressure plate 22 splined on the said flanged sleeve 18, the outer race 240 of the ball bearing 24 which is pressed in the cupped clutch pressure plate 22, and the inner race 2700 of the ball bearing 27 which is fixed into the said flanged sleeve 18.

When operating pressure is applied to the annular piston 26, axial movement and pressure are applied to the clutch pressure plate 22 as indicated by the dot and dash line 40 in Fig. 1 which causes the clutch plates 17 to be engaged by the clutch pressure plate 22, the clutch plates 21 and the flange 180 of the flanged sleeve 18 whereupon the gear or driven member 12 is rotated by the drive shaft 10.

Referring now to Fig. 3, another application or embodiment of the invention is shown operating a spring collet type chuck. In this second illustrative embodiment of the invention the headstock 50 of the machine has a spindle 51 journaled therein. The said spindle 51 is shouldered at 52 and provided with a shouldered sleeve bearing 53 against which the thrust nut 54 threaded on the spindle 51 is drawn to prevent axial movement of the said spindle 51 with respect to the headstock 50. The spindle 51 is driven in any desired manner not shown. A spring collet chuck 55 is mounted in the said spindle 51 and is caused to rotate therewith by means of a key 56 which extends into a suitable longitudinally disposed keyway 57 in the chuck 55. A drawbar 58 is threaded on the inner end of the chuck 55 and is provided with an annular shoulder 580 at its other end.

A sleeve 59 is mounted on the rear of the spindle 51 by a set screw 60 and is keyed thereto for rotation therewith by a suitable key 61. The said sleeve 59 is shouldered at 590 to abut against the end 510 of the said spindle 51. The inner race 620 of the combined radial and thrust type ball bearing 62 is pressed onto the said sleeve 59 and held from axial movement thereon between a retainer ring 63 and a spanner nut 64. A pressure ring 65 is splined in axial slidable relationship on the rear end of the sleeve 59 by means of suitable splines 66 and rotates therewith. The inner race 670 of the combined radial and thrust type ball bearing 670 is pressed on the pressure ring 65 against the shoulder 650 thereof and is axially fixed thereon by means of the spanner nut 68 threaded on the end of the said pressure ring 65. The said spanner nut 68 is counterbored at 680 to fit over the shouldered end 580 of the drawbar 58 and provides an annular flange 6800 axially thereover.

An annular cylinder 69 and an annular piston 70 reciprocatingly mounted therein are supported in radial spaced relationship to the sleeve 59 and the pressure ring 65 on the outer races 6200 and 6700 of the said combined radial and thrust type ball bearings 62 and 67 respectively. The outer race 6200 of the said ball bearing 62 is positioned in a suitable counterbore provided in the annular cylinder 69 and is fixed therein against axial movement relative thereto by a spanner nut 71. The outer race 6700 of the said ball bearing 67 is positioned in a suitable counterbore provided in the annular piston 70 and is fixed therein against axial movement relative thereto by a retainer ring 72. A bracket 73 is secured by a stud 74 to the headstock 50 and is provided with a groove 730 therein into which an axially disposed key 75 formed on the annular cylinder 69 slides freely. The said key 75 cooperating with the bracket 73 prevents the annular cylinder 69 from rotating.

The rearmost end of the annular cylinder 69 is bored and threaded to accommodate a spring retaining nut 76 which serves as an abutment for the piston return spring 77 which bears against the rearwardly facing annular end of the piston 70. The said cylinder 69 and piston 70 are provided with suitable inner and outer circumferentially disposed grooves 78 and 79 respectively which receive O-rings 80 or other suitable sealing means to prevent leakage of operating fluid from the cylinder chamber 690.

Fluid under pressure is supplied to the cylinder chamber 690 by means of a pressure supply line 81 threaded in a suitable bore 82 provided in the annular cylinder 69 which bore 82 is connected to the cylinder chamber 690 by a second bore 83.

The fluid operated collet type chuck disclosed in Fig. 3 is shown in its free position with the work W not engaged or held thereby. When fluid under operating pressure is applied to the piston 70 sufficient to cause axial movement of the said piston 70 against the normal urge of the piston return spring 77 axial movement is imparted to the drawbar 58 as indicated in the dot and dash line 84 to pull the spring collet chuck 55 in the interiorly frusto-conically formed tapered end of the spindle 51 causing the said spring collet chuck 55 to close onto and grip the work W whereupon the said work W is rotated with the said spindle 51.

It will be noted that in both of the embodiments of the invention disclosed herein for the purpose of illustrating the invention the axial pressure and movement between rotating parts is applied from a non-rotating cylinder and piston through anti-friction means and that the pressure seals employed are not subject to frictional wear. Also, the rotating parts are relatively small in dimension and consequently create a minimum of inertia. The construction is adaptable to use under high speed and pressures, is inexpensive to manufacture, and obviously may be adapted to advantage in many applications in addition to the two shown for the purpose of illustrating the invention. It will be further noted that a bellows or other expansible pressure chamber may be substituted for any cylinder-piston construction herein disclosed.

Although but two specific embodiments of the invention and improved method of applying axial movement to rotating elements have been disclosed herein, it is obvious that many changes may be made in the method and structure including changes in the size, shape, arrangement and details of the various elements of the invention without departing from the spirit and scope thereof as defined by the appended claim.

I claim:

Means for applying balanced concentric axial pressure on and movement to an axially movable element on a rotatable shaft comprising a thrust type bearing mounted on the rotating shaft with the inner race thereof fixed in relationship to the said rotatable shaft, a cylinder including a slidable piston therein mounted on the outer race of the said thrust bearing, the said axially movable element on the said rotatable shaft carrying a second thrust bearing with the outer race thereof fixed in relationship thereto, a portion of the said slidable piston carried by the said cylinder on the outer race of the first mentioned thrust bearing contacting the inner race of the said second mentioned thrust bearing causing axial pressure on and movement to the said axially movable element when fluid pressure is applied to said piston within said cylinder during the rotation of the said shaft.

THEODORE A. SCHAAD.

REFERENCES CITED

The following references are of record in the file of this patent:

UNITED STATES PATENTS

| Number | Name | Date |
| --- | --- | --- |
| 1,197,002 | Woody | Sept. 5, 1916 |
| 1,364,392 | Macho | Jan. 4, 1921 |
| 1,613,090 | Fornaca | Jan. 4, 1927 |
| 2,055,970 | Fippard | Sept. 29, 1936 |
| 2,117,852 | Pearmain | May 17, 1938 |
| 2,257,364 | Bakewell | Sept. 30, 1941 |
| 2,279,730 | Bradley | Apr. 14, 1942 |
| 2,340,315 | Fawick | Feb. 1, 1944 |
| 2,362,146 | Mariotte | Nov. 7, 1944 |
| 2,452,775 | Lindsley | Nov. 2, 1948 |

FOREIGN PATENTS

| Number | Country | Date |
| --- | --- | --- |
| 538,509 | Germany | July 19, 1930 |
| 420,616 | Great Britain | Dec. 5, 1934 |
| 863,720 | France | Jan. 6, 1941 |